(12) United States Patent
Peng et al.

(10) Patent No.: US 12,487,465 B2
(45) Date of Patent: Dec. 2, 2025

(54) HEAD-UP DISPLAY DEVICE

(71) Applicant: Coretronic Corporation, Hsin-Chu (TW)

(72) Inventors: Kuei-En Peng, Hsin-Chu (TW); Po-Che Lee, Hsin-Chu (TW); Tao-Hung Kuo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 557 days.

(21) Appl. No.: 17/724,510

(22) Filed: Apr. 20, 2022

(65) Prior Publication Data

US 2022/0373813 A1 Nov. 24, 2022

Related U.S. Application Data

(60) Provisional application No. 63/191,337, filed on May 21, 2021.

(30) Foreign Application Priority Data

Jul. 13, 2021 (CN) .......................... 202110788123.6
Sep. 24, 2021 (CN) .......................... 202111119671.6

(51) Int. Cl.
*G02B 27/01* (2006.01)
*G02B 27/00* (2006.01)
*G02B 27/09* (2006.01)

(52) U.S. Cl.
CPC ..... *G02B 27/0179* (2013.01); *G02B 27/0093* (2013.01); *G02B 27/0101* (2013.01);
(Continued)

(58) Field of Classification Search
CPC .... G02B 27/01–0189; G02B 2027/0105–0198
See application file for complete search history.

(56) References Cited

U.S. PATENT DOCUMENTS 10,423,053 B2    9/2019   Lee
10,606,075 B2    3/2020   Choi et al.
(Continued)

FOREIGN PATENT DOCUMENTS

CN    106483664    3/2017
CN    106471417    3/2019
(Continued)

OTHER PUBLICATIONS

"Search Report of Europe Counterpart Application", issued on Jan. 26, 2023, p. 1-p. 13.
(Continued)

*Primary Examiner* — Christopher A Lamb, II
(74) *Attorney, Agent, or Firm* — JCIPRNET (57) ABSTRACT

A head-up display device adapted to project a first image beam and a second image beam onto a target element is provided. The head-up display device includes a display unit, a first optical module, and a second optical module. The first and the second image beams from the display unit are sequentially transmitted the first and the second optical modules. The first image beam and the second image beam are respectively reflected by the second optical module out of the head-up display, and then transmitted to the target element to form a first virtual image and a second virtual image. Through the first optical module, the optical path length of the first image beam from the display unit to the position of the first virtual image is greater than the optical path length of the second image beam from the display unit to the position of the second virtual image.

19 Claims, 6 Drawing Sheets

(52) U.S. Cl.
CPC ..... *G02B 27/0955* (2013.01); *G02B 27/0983* (2013.01); *G02B 2027/0187* (2013.01)

(56) References Cited

U.S. PATENT DOCUMENTS

| | | | |
|---|---|---|---|
| 2009/0303158 | A1 | 12/2009 | Takahashi et al. |
| 2017/0357088 | A1 | 12/2017 | Matsuzaki et al. |
| 2018/0129042 | A1* | 5/2018 | Yamazoe ................ G02B 27/14 |
| 2018/0259770 | A1* | 9/2018 | Kuzuhara ............. G03B 21/142 |
| 2020/0012099 | A1* | 1/2020 | Kim ..................... G02B 27/283 |
| 2020/0018977 | A1 | 1/2020 | Qin et al. |
| 2020/0183161 | A1 | 6/2020 | Choi et al. |
| 2020/0209618 | A1 | 7/2020 | Lee |
| 2021/0011286 | A1* | 1/2021 | Morohashi ............. G03B 21/28 |

FOREIGN PATENT DOCUMENTS

| | | |
|---|---|---|
| CN | 109581667 | 4/2019 |
| CN | 109643016 | 4/2019 |
| CN | 210348060 | 4/2020 |
| CN | 112639581 | 4/2021 |
| CN | 112789545 | 5/2021 |
| CN | 113296266 | 8/2021 |
| JP | S62137236 | 6/1987 |
| JP | 2013214008 | 10/2013 |
| JP | 2015087619 | 5/2015 |
| JP | 2020148974 | 9/2020 |
| TW | I533028 | 5/2016 |
| TW | M554174 | 1/2018 |
| TW | I676823 | 11/2019 |
| WO | 2018105534 | 6/2018 |

OTHER PUBLICATIONS

Zong Qin et al., "Dual-focal-plane augmented reality head-up display using a single picture generation unit and a single freeform mirror", Applied Optics, Jul. 2019, pp. 1-10.
"Office Action of China Counterpart Application", issued on Mar. 31, 2025, p. 1-p. 7.
"Office Action of Japan Counterpart Application", issued on Jul. 1, 2025, p. 1-p. 11.

* cited by examiner

HEAD-UP DISPLAY DEVICE

CROSS-REFERENCE TO RELATED APPLICATION

This application claims the priority benefits of U.S. provisional Ser. No. 63/191,337, filed on May 21, 2021, China application serial no. 202110788123.6, filed on Jul. 13, 2021, and China application serial no. 202111119671.6, filed on Sep. 24, 2021. The entirety of the above-mentioned patent applications is hereby incorporated by reference herein and made a part of this specification.

BACKGROUND

Technical Field

The invention relates to a display device, particularly to a head-up display device.

Description of Related Art

An augmented reality head-up display device for cars is generally designed to display images of two different contents. The content shown in one image presents fixed driving information, such as vehicle speed, fuel level, mileage, speed limit, while the content shown in the other image presents driving information that relates to the road conditions, such as left and right turn signs, landmark information, and warning signs. The image that shows the fixed driving information is expected to be displayed at a lesser depth like 2 m from a driver, while the image that shows the driving information relating to the road conditions is displayed at a deeper depth like 8 m from the driver.

In the current architecture of augmented reality head-up display device, there are usually two picture generation units (PGU) placed in different positions to respectively generate two image with different image distances. However, due to the two image generation units, the overall architecture has disadvantages such as larger volume, heavier arrangement, larger power consumption, and larger cost.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The present invention provides a head-up display device capable of providing effects of reducing the system volume, cutting the power consumption, and further lowering the cost.

Other objectives and advantages of the present invention can be further understood from the technical features disclosed in the invention.

To achieve one or part or all of the above objectives or other objectives, an embodiment of the present invention provides a head-up display device adapted to project a first image beam and a second image beam onto a target element. The head-up display device includes a display unit, a first optical module, and a second optical module. The display unit is adapted to provide the first image beam and the second image beam. The first optical module receives the first image beam and the second image beam from the display unit, and transmits the first image beam and the second image beam to the second optical module. The second optical module includes a freeform mirror. The freeform mirror is adapted to receive the first image beam and the second image beam from the first optical module. The first image beam and the second image beam are respectively reflected by the second optical module out of the head-up display device, and then transmitted to the target element to form a first virtual image and a second virtual image. Through the first optical module, the optical path length of the first image beam from the display unit to the position of the first virtual image formed by the first image beam is greater than the optical path length of the second image beam from the display unit to the position of the second virtual image formed by the second image beam.

In an embodiment of the present invention, the head-up display device further includes a sensor and a controller. The sensor is adapted to sense a position of an eye for generating sensing signals. The controller is electrically connected to the sensor and coupled with the second optical module. The controller receives sensing signals from the sensor and adjusts a deflection angle of the freeform mirror based on a position change of the eye, so that the first virtual image and the second virtual image are presented clearly.

In an embodiment of the invention, the first image beam and the second image beam from the first optical module are incident on the second optical module at different angles.

In an embodiment of the invention, the display unit has a first effective imaging area and a second effective imaging area that are disposed adjacently to respectively generate the first image beam and the second image beam, and the first virtual image and the second virtual image formed outside the head-up display device respectively present different image contents.

In an embodiment of the invention, the first optical module includes a first reflective surface, a second reflective surface, and a third reflective surface that are disposed adjacently.

In an embodiment of the invention, the first image beam from the display unit is sequentially reflected by the second reflective surface and the third reflective surface to the second optical module, and the second image beam from the display unit is reflected by the first reflective surface to the second optical module.

In an embodiment of the invention, an obtuse angle is formed between the first reflective surface and the second reflective surface, and an acute angle is formed between the second reflective surface and the third reflective surface.

In an embodiment of the invention, the first reflective surface and the third reflective surface are not directly connected.

In an embodiment of the invention, the first optical module is a polygonal transparent body. The first reflection surface, the second reflection surface, and the third reflection surface are respectively disposed on three surfaces of the polygonal transparent body.

In an embodiment of the present invention, the first optical module further includes a polygonal transparent body. The first reflective surface and the second reflective surface are respectively disposed on two surfaces of the polygonal transparent body. The third reflective surface is a surface of a plane mirror.

In an embodiment of the invention, the first optical module is a plurality of plane mirrors.

In an embodiment of the invention, the first optical module includes a curved mirror and a convex lens.

In an embodiment of the invention, the first image beam from the display unit is reflected by the curved mirror to the second optical module. The second image beam from the display unit first passes through the convex lens and then is reflected by the curved mirror to the second optical module. The convex lens is not disposed on a transmission path of the first image beam.

In an embodiment of the invention, the curved mirror is a freeform mirror.

In an embodiment of the invention, the optical path length of the first image beam from the display unit to the curved mirror is larger than the optical path length of the second image beam from the display unit to the curved mirror.

In an embodiment of the invention, the curved mirror is not parallel to the display unit, and the curved mirror is not parallel to the second optical module.

In an embodiment of the invention, the first optical module comprises a first reflection mirror and a second reflection mirror that are disposed adjacently.

In an embodiment of the invention, the first image beam from the display unit is reflected by the first reflection mirror to the second optical module, and the second image beam from the display unit is reflected by the second reflection mirror to the second optical module.

In an embodiment of the invention, the optical path length of the first image beam from the display unit to the second optical module is greater than the optical path length of the second image beam from the display unit to the second optical module.

In an embodiment of the invention, the second reflection mirror is not parallel to the second optical module, and the second reflection mirror is a curved mirror.

In an embodiment of the invention, the first reflection mirror is a plane mirror.

In an embodiment of the invention, the second reflection mirror is a freeform mirror.

In an embodiment of the invention, the first reflection mirror is a freeform mirror, and the second reflection mirror is a freeform mirror.

Based on the above, in an embodiment of the t invention, the head-up display device is designed to enable a single display unit to generate the first image beam and the second image beam respectively from two effective imaging areas, such that the overall architecture of the head-up display device has the advantages of smaller size, lower power consumption, and lower cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
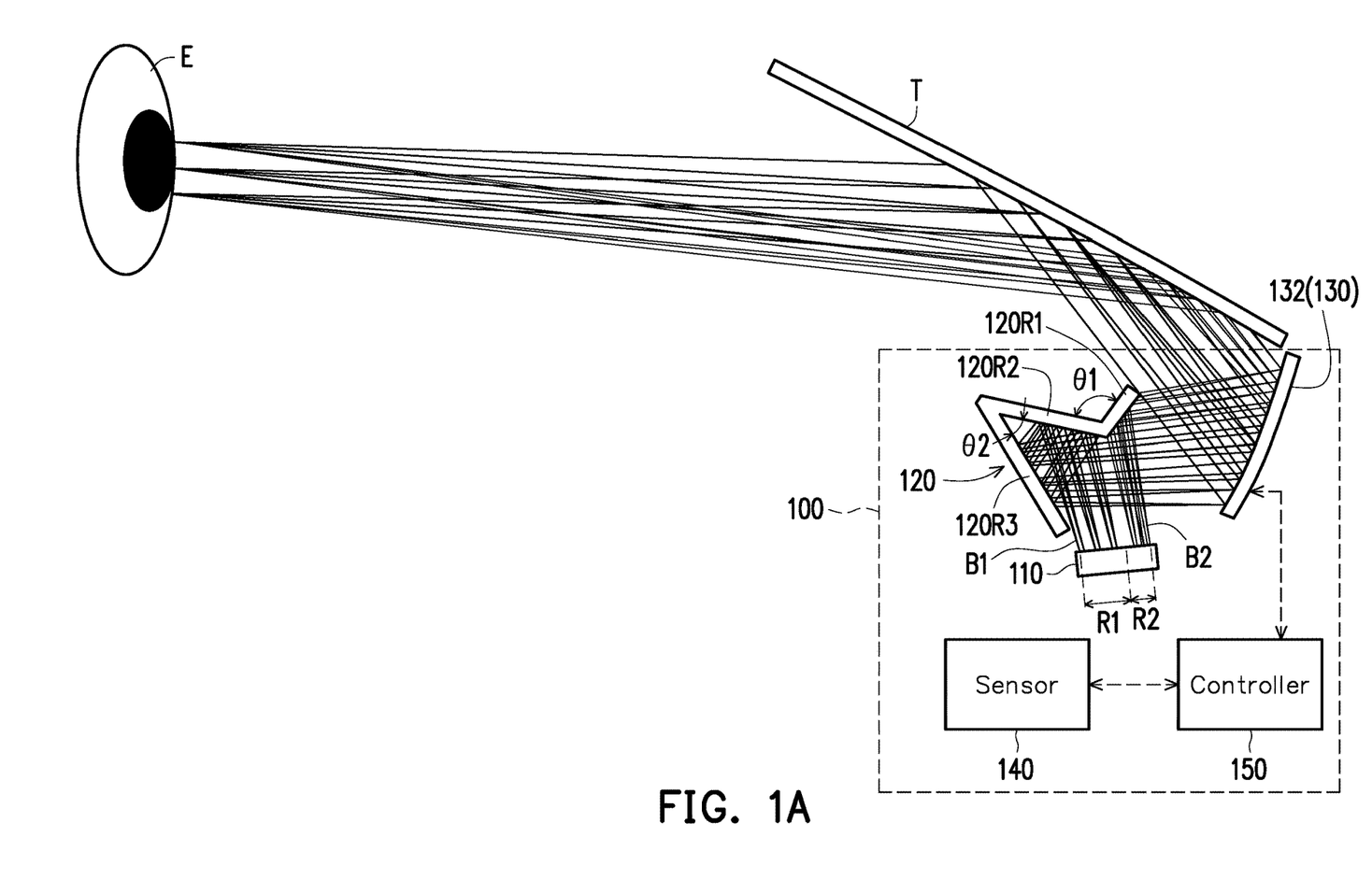
FIG. 1A is a schematic diagram of a head-up display device according to a first embodiment of the invention.
Figure 1B:
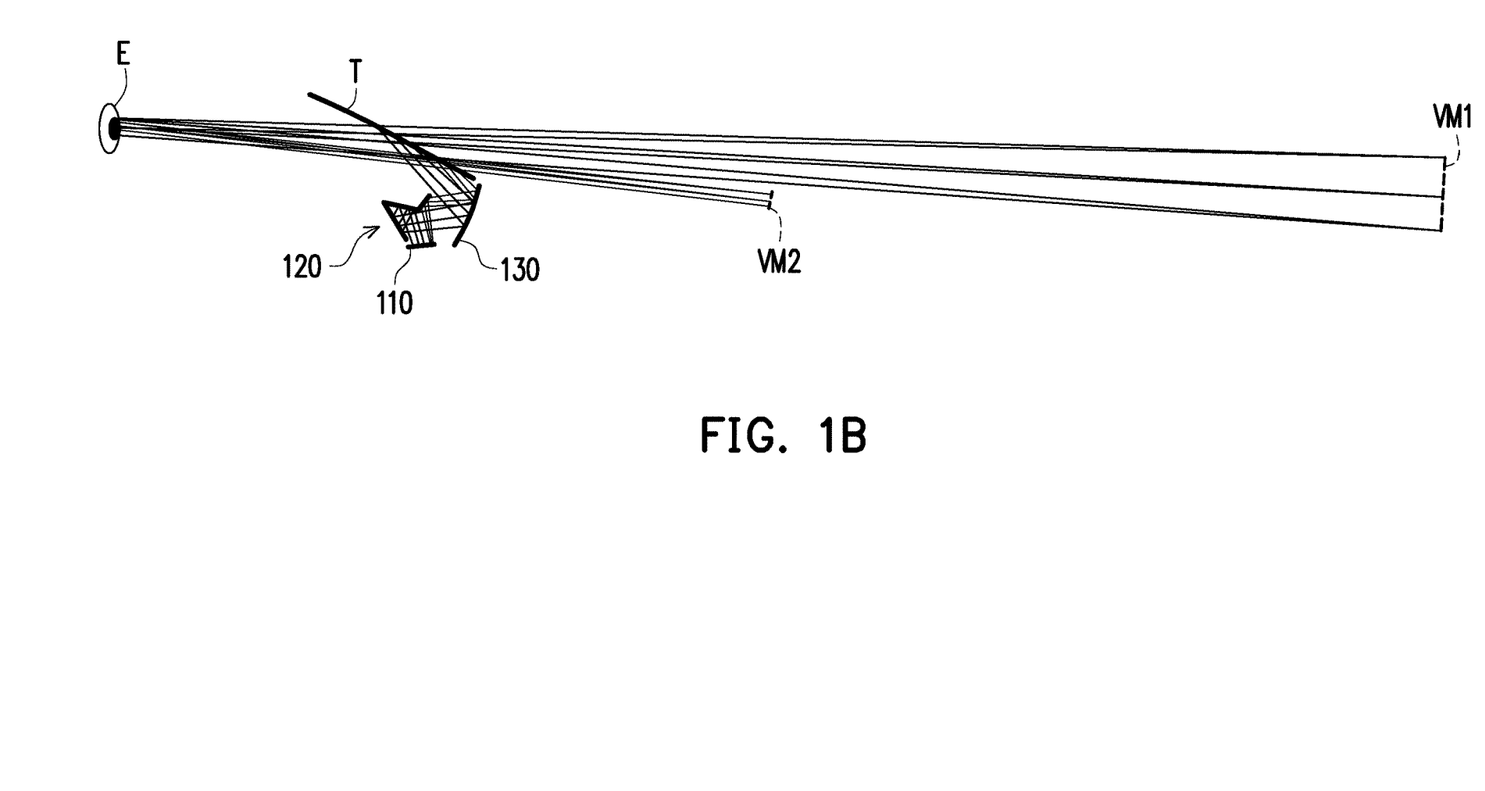
FIG. 1B is a schematic diagram of two virtual images formed by the head-up display device according to the first embodiment of the invention.

FIG. 1A is a schematic diagram of a head-up display device according to a first embodiment of the invention. FIG. 1B is a schematic diagram of two virtual images formed by the head-up display device according to the first embodiment of the invention. In FIG. 1A and FIG. 1B, an embodiment of the invention provides a head-up display device 100 adapted to project a first image beam B1 and a second image beam B2 onto a target element T. In this embodiment, the head-up display device 100 is, for example, installed on vehicles such as automobiles. The target element T is, for example, the windshield of the vehicle. The first image beam B1 and the second image beam B2 are reflected by the target element T to an eye E of a viewer (for example, the driver of the vehicle), and the viewer is allowed to view a first virtual image VM1 and a second virtual image VM2 that are formed at different image distances and show different driving information in front of the target component T.

In this embodiment, the head-up display device 100 includes a display unit 110, a first optical module 120, and a second optical module 130. The display unit 110 is adapted to provide the first image beam B1 and the second image beam B2. Specifically, the display unit 110 has a first effective imaging area R1 and a second effective imaging area R2 that are disposed adjacently. In the embodiment, the display unit 110 may be a picture generation unit (PGU), which includes, for example, a transmissive liquid crystal panels or other light beam modulators. And in the embodiment the first effective imaging area R1 and the second effective imaging area R2 are arranged on the same plane of the display unit 110. The first effective imaging area R1 and the second effective imaging area R2 are adapted to respectively generate the first image beam B1 and the second image beam B2. The first virtual image VM1 and the second virtual image VM2 formed outside the head-up display device 100 respectively present different image contents (for example, driving information). The first optical module 120 receives the first image beam B1 and the second image beam B2 from the display unit 110, and transmits the first image beam B1 and the second image beam B2 to the second optical module 130.

In this embodiment, the first optical module 120 includes a first reflective surface 120R1, a second reflective surface 120R2, and a third reflective surface 120R3 that are disposed adjacently. The first image beam B1 emitted from the first effective imaging area R1 of the display unit 110 is sequentially reflected by the second reflective surface 120R2 and the third reflective surface 120R3 of the first optical module 120 and is transmitted to the second optical module 130. The second image beam B2 emitted from the second effective imaging area R2 of the display unit 110 is reflected by the first reflective surface 120R1 of the first optical module 120 and is transmitted to the second optical module 130. The second reflective surface 120R2 and the third reflective surface 120R3 of the first optical module 120 are not disposed on a transmission path of the second image beam B2, and the first reflective surface 120R1 of the first optical module 120 is not disposed on a transmission path of the first image beam B1.

In this embodiment, an obtuse angle θ1 is formed between the first reflective surface 120R1 and the second reflective surface 120R2, and an acute angle θ2 is formed between the second reflective surface 120R2 and the third reflective surface 120R3. The first reflective surface 120R1 and the third reflective surface 120R3 are not directly connected. The first reflective surface 120R1 is connected to the third reflective surface 120R3 through the second reflective surface 120R2. In this embodiment, one end of the first reflective surface 120R1 is connected to one end of the second reflective surface 120R2, the opposite end of the second reflective surface 120R2 is connected to one end of the third reflective surface 120R3 so as to form the acute angle θ2 between the second reflective surface 120R2 and the third reflective surface 120R3. The second reflective surface 120R2 and the third reflective surface 120R3 are arranged to faces the display unit 110.

In this embodiment, the first image beam B1 and the second image beam B2 reflected from the first optical module 120 are incident on the second optical module 130 at different angles. The second optical module 130 includes a freeform mirror 132. The freeform mirror 132 is adapted to receive the first image beam B1 and the second image beam B2 from the first optical module 120. The first image beam B1 and the second image beam B2 are respectively reflected by the second optical module 130 out of the head-up display device 100, and then transmitted to the target element T to form the first virtual image VM1 and the second virtual image VM2. In accordance with the arrangement of the first optical module 120, an optical path length of the first image beam B1 from the display unit 110 to the position of the first virtual image VM1 formed by the first image beam B1 is greater than an optical path length of the second image beam B2 from the display unit 110 to the position of the second virtual image VM2 formed by the second image beam B2.

In this embodiment, the head-up display device 100 further includes a sensor 140 and a controller 150. The sensor 140 is adapted to sense the position of an eye E of the user (driver). The controller 150 includes, for example, a microcontroller unit (MCU), a central processing unit (CPU), a microprocessor, a digital signal processor (DSP), a programmable controller, a programmable logic device (PLD), other similar devices, or a combination thereof, to which the present invention is not limited. In addition, in an embodiment, each function of the controller 150 may be implemented as multiple program codes. These program codes are stored in a memory, and the controller 150 executes these program codes. Or, in an embodiment, each function of the controller 150 may be implemented as one or more circuits. The present invention does not limit to use software or hardware to implement the functions of the controller 150.

In this embodiment, the controller 150 is electrically connected to the sensor 140 and is coupled to the second optical module 130. The second optical module 130 includes, for example, a driver (not shown) which is connected to the freeform mirror 132 for driving the freeform mirror 132 to move. The sensor 140 senses the position of the eye E of the user for generating sensing signals, and transmits the sensing signals having the information on the position of the eye E to the controller 150. The controller 150 receives sensing signal from the sensor 140 and controls the driver to adjust the deflection angle of the freeform mirror 132 based on the position change of the eye E, so that the first virtual image VM1 and the second virtual image VM2 are presented clearly.

Based on the above, in an embodiment of the invention, the head-up display device 100 is designed to enable the single display unit 110 to generate the first image beam B1 and the second image beam B2. The head-up display device 100 is designed as follows: the first image beam B1 is reflected at least twice at the first optical module 120, and the second image beam B2 is reflected once by the first optical module 120, such that the optical path length of the first image beam B1 from the display unit 110 to the position of the first virtual image VM1 is greater than the optical path length of the second image beam B2 from the display unit 110 to the position of the second virtual image VM2.

Therefore, the overall architecture of the head-up display device 100 has the advantages of smaller size, lower power consumption, and lower cost.

Figure 2:
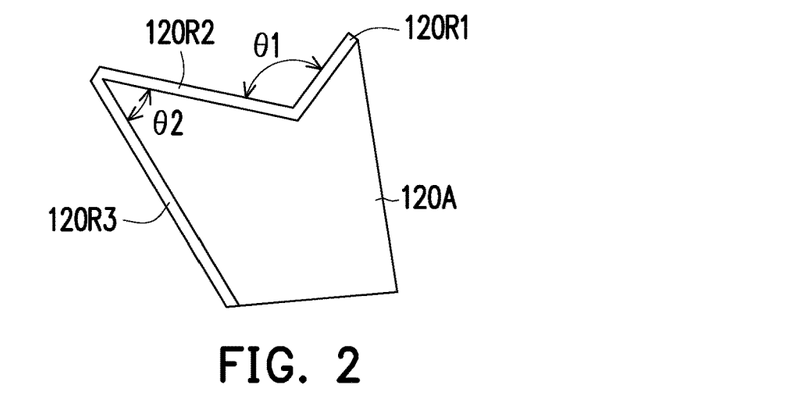
FIG. 2 is a schematic diagram of a first optical module in a head-up display device according to a second embodiment of the invention.

FIG. 2 is a schematic diagram of a first optical module in a head-up display device according to a second embodiment of the invention. In FIG. 2, a first optical module 120A of FIG. 2 is similar to the first optical module 120 of FIG. 1A, and their main differences are as follows. In this embodiment, the first optical module 120A is a polygonal transparent body, and the material of the transparent body is, for example, glass. A first reflective surface 120R1, a second reflective surface 120R2, and a third reflective surface 120R3 of the first optical module 120A are disposed on three surfaces of the polygonal transparent body. For example, the three surfaces of the polygonal transparent body are respectively disposed with reflective layers to form the first reflective surface 120R1, the second reflective surface 120R2, and the third reflective surface 120R3. The advantages of the head-up display device according to the second embodiment of the invention are similar to those of the head-up display device 100 in FIG. 1A, which are not repeated here.

Figure 3:
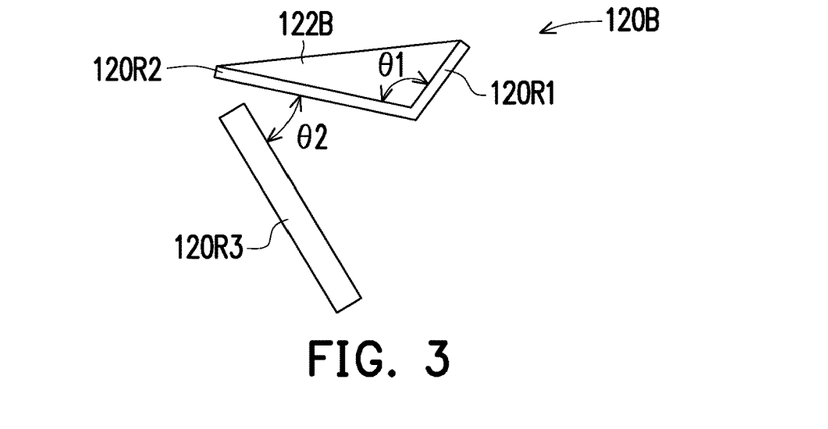
FIG. 3 is a schematic diagram of a first optical module in a head-up display device according to a third embodiment of the invention.

FIG. 3 is a schematic diagram of a first optical module in a head-up display device according to a third embodiment of the present invention. In FIG. 3, a first optical module 120B of FIG. 3 is similar to the first optical module 120 of FIG. 1A, and their main differences are as follows. In this embodiment, the first optical module 120B further includes a polygonal transparent body 122B, and the material of the transparent body is, for example, glass. A first reflection surface 120R1 and a second reflection surface 120R2 are disposed on two surfaces of the polygonal transparent body 122B. For example, the two surfaces of the polygonal transparent body are respectively disposed with reflective layers to form the first reflective surface 120R1 and the second reflective surface 120R2. A third reflecting surface 120R3 is a surface of a plane mirror. Furthermore, the first reflective surface 120R1 is connected to the second reflective surface 120R2, the first reflective surface 120R1 is not connected to the third reflective surface 120R3, and the second reflective surface 120R2 is not connected to the third reflective surface 120R3. The advantages of the head-up display device according to the third embodiment of the invention are similar to those of the head-up display device 100 in FIG. 1A, which are not repeated here.

Figure 4:
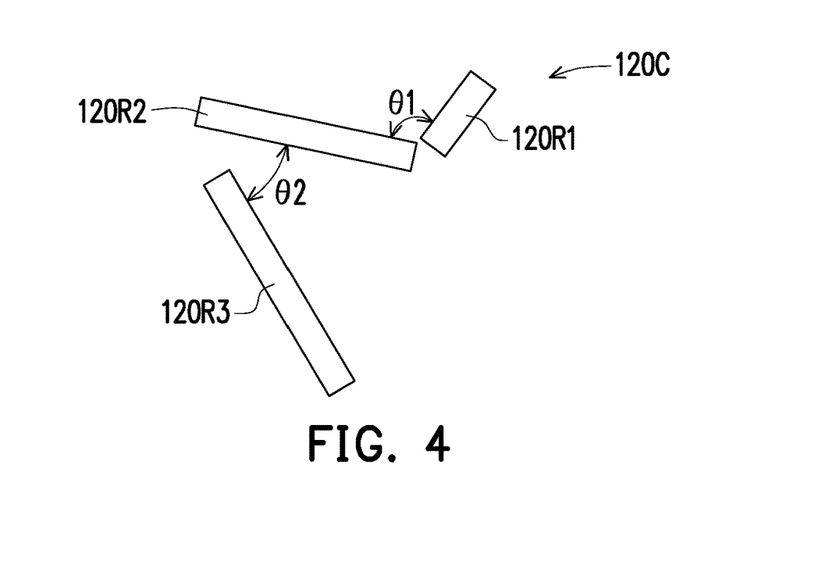
FIG. 4 is a schematic diagram of a first optical module in a head-up display device according to a fourth embodiment of the present invention.

FIG. 4 is a schematic diagram of a first optical module in a head-up display device according to a fourth embodiment of the invention. In FIG. 4, a first optical module 120C of FIG. 4 is similar to the first optical module 120 of FIG. 1A, and their main differences are as follows. In this embodiment, the first optical module 120C has a plurality of plane mirrors, and the plane mirrors are separated from each other. Three surfaces of the plane mirrors are respectively defined as a first reflective surface 120R1, a second reflective surface 120R2, and a third reflective surface 120R3. In other words, a first reflective surface 120R1, a second reflective surface 120R2, and a third reflective surface 120R3 are not connected to each other. However, in other embodiments, the plane mirrors may also be connected to each other. The advantages of the head-up display device according to the fourth embodiment of the present invention are similar to those of the head-up display device 100 in FIG. 1A, which are not repeated here.

Figure 5:
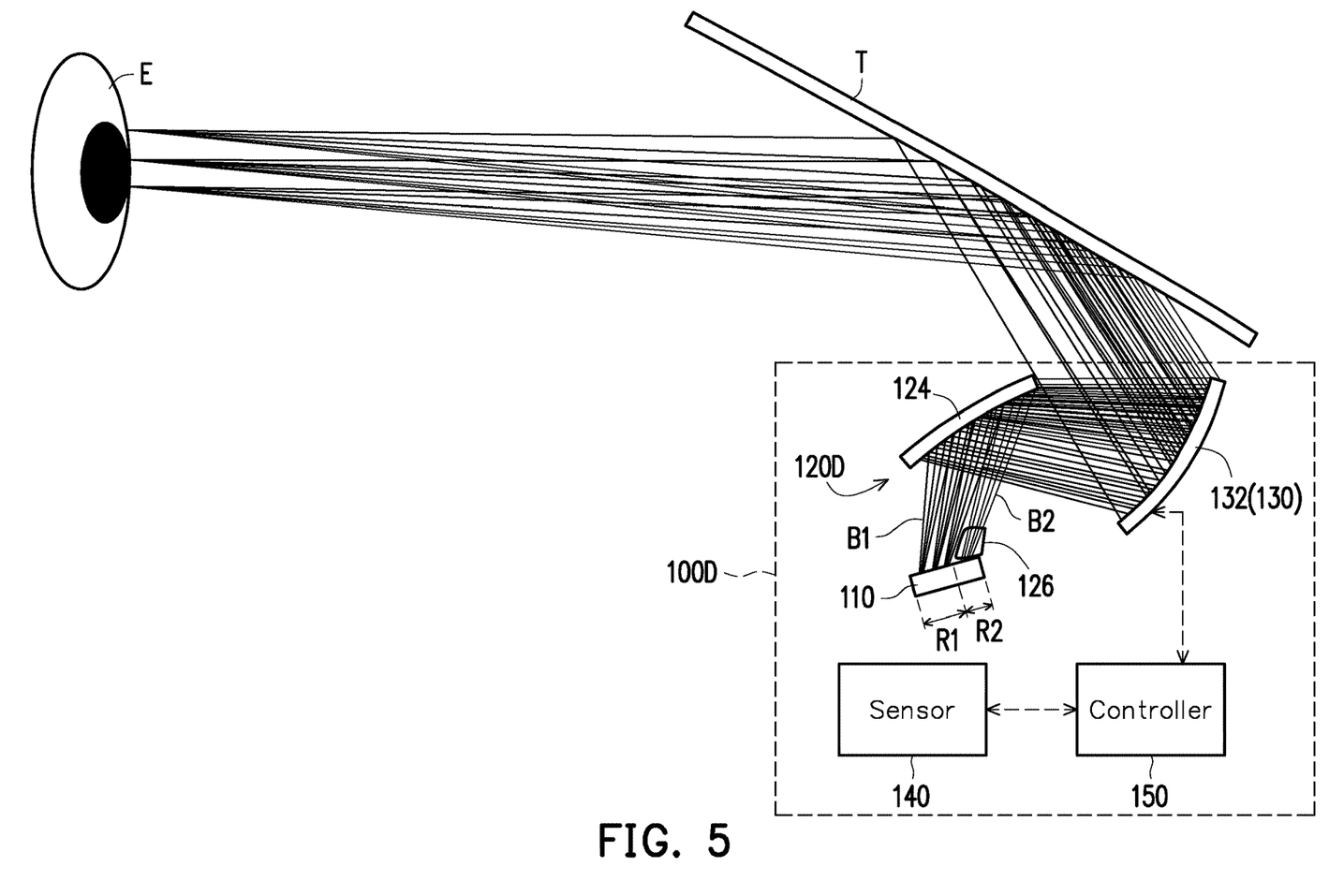
FIG. 5 is a schematic diagram of a head-up display device according to a fifth embodiment of the invention.

FIG. 5 is a schematic diagram of a head-up display device according to a fifth embodiment of the invention. In FIG. 5, a head-up display device 100D of FIG. 5 is similar to the head-up display device 100 of FIG. 1A, and the relative position of the virtual image formed by the head-up display device 100D of FIG. 5 is similar to the two virtual images of FIG. 1B, and their main differences are as follows. In this embodiment, the first optical module 120D includes a curved mirror 124 and a convex lens 126. The curved mirror 124 is, for example, configured with a concave reflective surface facing a display unit 110. The curved mirror 124 may be a freeform mirror.

Specifically, in this embodiment, a first image beam B1 from a first effective imaging area R1 of the display unit 110 is reflected by the concave reflective surface of the curved mirror 124 to the second optical module 130, and a second image beam B2 from a second effective imaging area R2 of the display unit 110 first passes through the convex lens 126 and then is reflected by the concave reflective surface of the curved mirror 124 to the second optical module 130. The convex lens 126 is not disposed on the transmission path of the first image beam B1, and is disposed between the second effective imaging area R2 and the curved mirror 124.

In this embodiment, the optical path length of the first image beam B1 from the display unit 110 to the curved mirror 124 is greater than the optical path length of the second image beam B2 from the display unit 110 to the curved mirror 124.

In this embodiment, the curved mirror 124 is not parallel to the display unit 110, and the curved mirror 124 is not parallel to the second optical module 130.

Based on the above, in the fifth embodiment of the invention, the head-up display device 100D is provided with the convex lens 126 to reduce the optical path length of the second image beam B2, so that the optical path length of the first image beam B1 is greater than that of the second image beam B2. Therefore, fewer optical elements are disposed within the head-up display device 100D and the head-up display device 100D has a clearer and simpler design of optical path. The rest of the advantages of the head-up display device 100D are similar to those of the head-up display device 100 in FIG. 1A, which are not repeated here.

Figure 6:
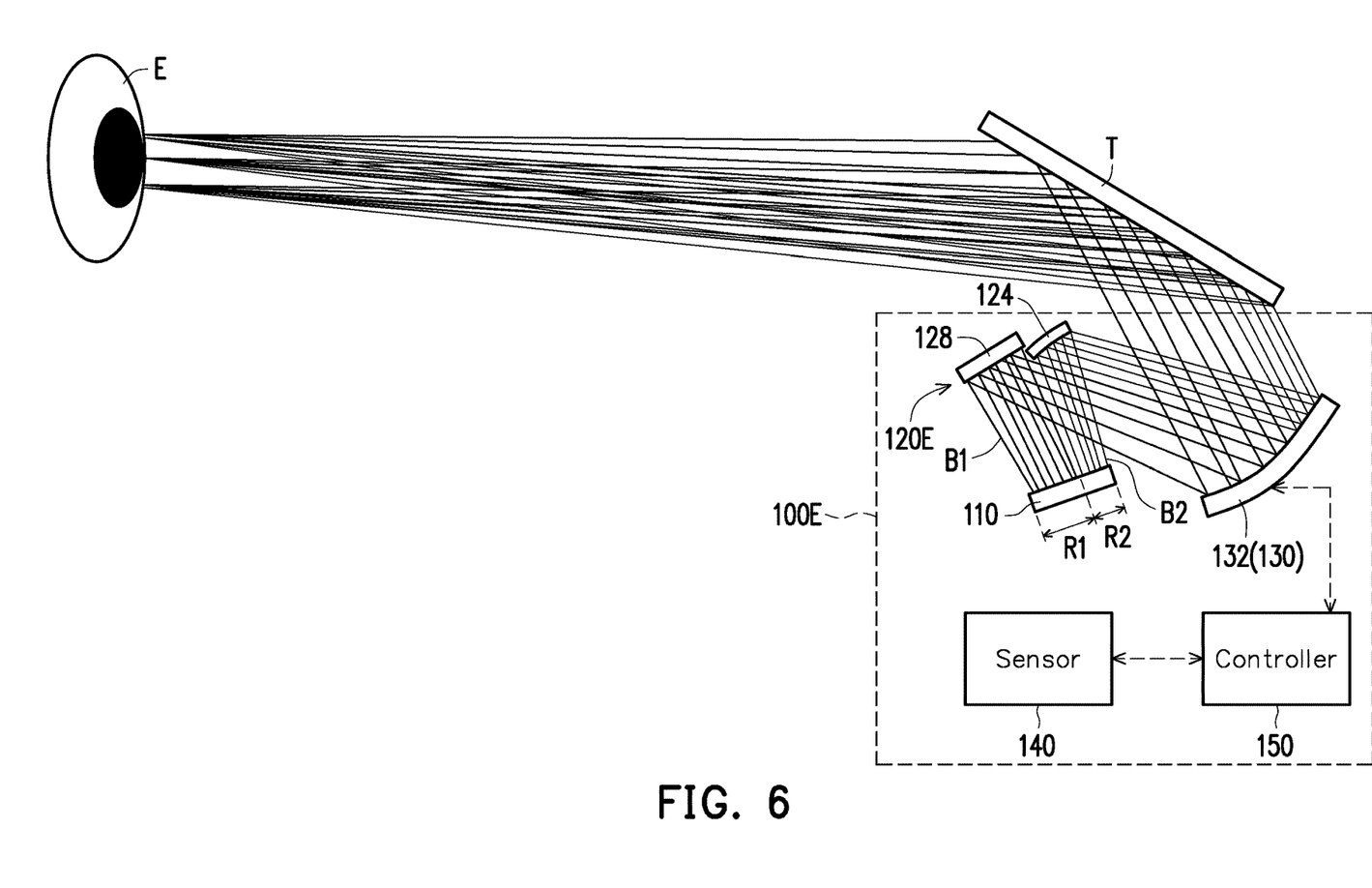
FIG. 6 is a schematic diagram of a head-up display device according to a sixth embodiment of the present invention.

FIG. 6 is a schematic diagram of a head-up display device according to a sixth embodiment of the invention. The head-up display device of FIG. 6 is a modification of the head-up display device in the first embodiment and the sixth embodiment. In FIG. 6, a head-up display device 100E of FIG. 6 is similar to the head-up display device 100 of FIG. 1A and the head-up display device 100D of FIG. 5, and the relative position of the virtual image formed by the head-up display device 100E of FIG. 6 is also similar to that of FIG. 1B, and their main differences are as follows. The first optical module 120D of the head-up display device 100D of FIG. 5 includes a single curved mirror 124, whereas in this embodiment, a first optical module 120E includes a first reflection mirror and a second reflection mirror that are disposed adjacently, and the second reflection mirror and the first reflection mirror in the embodiment of FIG. 6 are respectively a curved mirror 124 and a plane mirror 128. The curved mirror 124 may be a spherical mirror, aspheric mirror, or freeform mirror. In this embodiment, the spherical mirror has a partial spherical shape, and the aspheric mirror has a partial aspherical shape. A first image beam B1 from a first effective imaging area R1 of a display unit 110 is reflected by the plane mirror 128 to a second optical module 130 to generate a first virtual image, such that the optical path length of the first image beam B1 from the display unit 110 to the position of the first virtual image is longer. A second image beam B2 from a second effective imaging area R2 of the display unit 110 is reflected by the curved mirror 124 to the second optical module 130 to generate a second virtual image, such that the optical path length of the second image beam B2 from the display unit 110 to the position of the second virtual image is shorter. The optical path length of the second image beam B2 is reduced by the configuration of the curved mirror 124, such that the optical path length of the first image beam B1 from the display unit 110 to the second optical module 130 is greater than the optical path length of the second image beam B2 from the display unit 110 to the second optical module 130.

In this embodiment, the curved mirror 124 is not parallel to the second optical module 130. The curved mirror 124 is a freeform mirror. And the advantages of the head-up display device 100E are similar to those of the head-up display device 100 in FIG. 1A, which are not repeated here.

Figure 7:
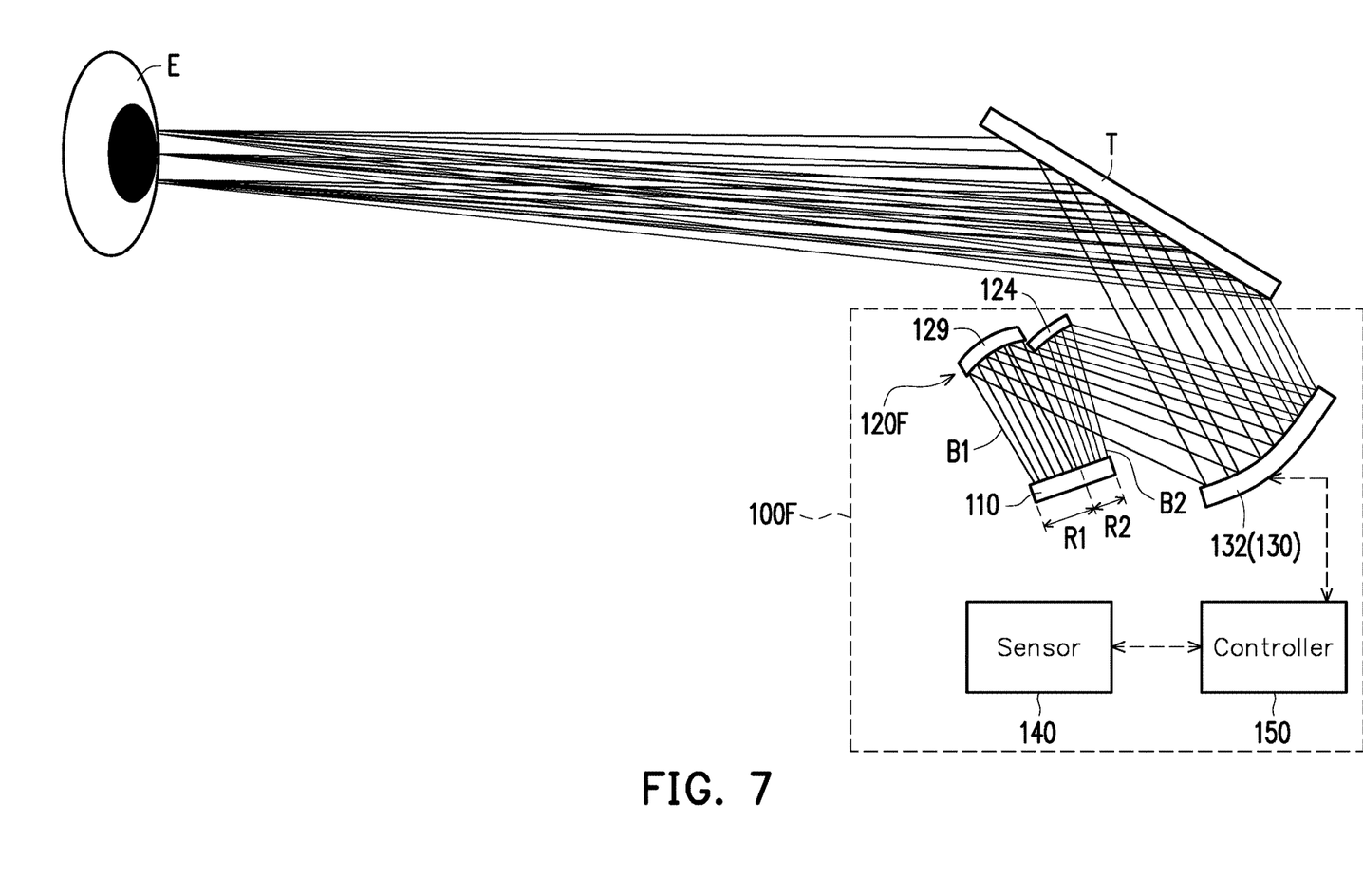
FIG. 7 is a schematic diagram of a head-up display device according to a seventh embodiment of the present invention.

FIG. 7 is a schematic diagram of a head-up display device according to a seventh embodiment of the invention. The head-up display device of the seventh embodiment is a modification of the sixth embodiment. In FIG. 7, the head-up display device 100F of FIG. 7 is similar to the head-up display device 100E of FIG. 6. The relative position of the virtual image in FIG. 7 is similar to that of FIG. 1B, and its main difference from the head-up display device 100E of FIG. 6 is described as follows. In this embodiment, the first optical module 120F includes a first reflection mirror and a second reflection mirror that are adjacently disposed. And the second reflection mirror and the first reflection mirror in the embodiment of FIG. 7 are respectively a curved mirror 124 and a curved mirror 129. The curvature of the curved mirror 124 is different from the curvature of the curved mirror 129. The first image beam B1 from the first effective imaging area R1 of the display unit 110 is reflected by the curved mirror 129 to the second optical module 130 to generate a first virtual image, such that the optical path length of the first image beam B1 from the display unit 110 to the position of the first virtual image is relatively long. The second image beam B2 from the second effective imaging area R2 of the display unit 110 is reflected by the curved mirror 124 to the second optical module 130 to generate a second virtual image, such that the optical path length of the second image beam B2 from the display unit 110 to the position of the second virtual image is relatively short. By arranging the curved mirror 124 and the curved mirror 129 having different curvatures, the optical path length of the second image beam B2 is reduced, which makes the optical path length of the first image beam B1 from the display unit 110 to the second optical module 130 greater than the optical path length of the second image beam B2 from the display unit 110 to the second optical module 130.

In this embodiment, the curved mirror 124 and the second optical module 130 are not parallel. And the curved mirror 129 and the curved mirror 124 are both a freeform mirror. Since the advantages of the head-up display device 100F are similar to the head-up display device 100 of FIG. 1A and the head-up display device of FIG. 6, the same is not repeated herein.

In summary, in an embodiment of the present invention, the head-up display device is designed to enable the display unit to generate a first image beam and a second image beam, and with the design of the first optical module, the optical path length of the first image beam from the display unit to the position of the first virtual image is greater than the optical path length of the second image beam from the display unit to the position of the second virtual image. Therefore, the overall architecture of the head-up display device has the advantages of smaller size, lower power consumption, and lower cost.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A head-up display device adapted to project a first image beam and a second image beam onto a target element, the head-up display device comprising:
   a display unit, a first optical module, and a second optical module, wherein:
      the display unit is adapted to provide the first image beam and the second image beam;
      the first optical module receives the first image beam and the second image beam from the display unit, and transmits the first image beam and the second image beam to the second optical module, wherein the first optical module comprises a first reflective surface, a second reflective surface, and a third reflective surface that are disposed adjacently, the first image beam from the display unit is sequentially reflected by the second reflective surface and the third reflective surface, and the first image beam reflected by the third reflective surface is directly transmitted from the third reflective surface to the second optical module, and the second image beam from the display unit is reflected by the first reflective surface to the second optical module, wherein the first image beam and the second image beam are non-polarized image beams; and
      the second optical module comprises a freeform mirror for receiving the first image beam and the second image beam from the first optical module, the first image beam and the second image beam are respectively reflected by the second optical module out of the head-up display device and then transmitted to the target element to form a first virtual image and a second virtual image, wherein, through the first optical module, an optical path length of the first image beam from the display unit to a position of the first virtual image formed by the first image beam is greater than an optical path length of the second image beam from the display unit to a position of the second virtual image formed by the second image beam.

2. The head-up display device according to claim 1, further comprising a sensor and a controller, wherein:
the sensor is adapted to sense a position of an eye for generating sensing signals; and
the controller is electrically connected to the sensor and coupled with the second optical module, the controller receives sensing signals from the sensor and adjusts a deflection angle of the freeform mirror based on a position change of the eye, so that the first virtual image and the second virtual image are presented clearly.

3. The head-up display device according to claim 1, wherein the first image beam and the second image beam from the first optical module are incident on the second optical module at different angles.

4. The head-up display device according to claim 1, wherein the display unit has a first effective imaging area and a second effective imaging area that are disposed adjacently to respectively generate the first image beam and the second image beam, and the first virtual image and the second virtual image formed outside the head-up display device respectively present different image contents.

5. The head-up display device according to claim 1, wherein an obtuse angle is formed between the first reflective surface and the second reflective surface, and an acute angle is formed between the second reflective surface and the third reflective surface.

6. The head-up display device according to claim 1, wherein the first reflective surface and the third reflective surface are not directly connected.

7. The head-up display device according to claim 1, wherein: the first optical module is a polygonal transparent body; the first reflection surface, the second reflection surface, and the third reflection surface are respectively disposed on three surfaces of the polygonal transparent body.

8. The head-up display device according to claim 1, wherein: the first optical module further comprises a polygonal transparent body; the first reflective surface and the second reflective surface are respectively disposed on two surfaces of the polygonal transparent body, and the third reflective surface is a surface of a plane mirror.

9. The head-up display device according to claim 1, wherein the first optical module is a plurality of plane mirrors.

10. A head-up display device adapted to project a first image beam and a second image beam onto a target element, the head-up display device comprising:
a display unit, a first optical module, and a second optical module, wherein:
the display unit is adapted to provide the first image beam and the second image beam;
the first optical module receives the first image beam and the second image beam from the display unit, and transmits the first image beam and the second image beam to the second optical module,
wherein the first optical module comprises a curved mirror and a convex lens, wherein the curved mirror is not parallel to the display unit, and the curved mirror is not parallel to the second optical module; and
the second optical module comprises a freeform mirror for receiving the first image beam and the second image beam from the first optical module, the first image beam and the second image beam are respectively reflected by the second optical module out of the head-up display device and then transmitted to the target element to form a first virtual image and a second virtual image, wherein, through the first optical module, an optical path length of the first image beam from the display unit to a position of the first virtual image formed by the first image beam is greater than an optical path length of the second image beam from the display unit to a position of the second virtual image formed by the second image beam.

11. The head-up display device according to claim 10, wherein: the first image beam from the display unit is reflected by the curved mirror to the second optical module; the second image beam from the display unit first passes through the convex lens and then is reflected by the curved mirror to the second optical module, wherein the convex lens is not disposed on a transmission path of the first image beam.

12. The head-up display device according to claim 10, wherein the curved mirror is a freeform mirror.

13. The head-up display device according to claim 10, wherein an optical path length of the first image beam from the display unit to the curved mirror is larger than an optical path length of the second image beam from the display unit to the curved mirror.

14. A head-up display device adapted to project a first image beam and a second image beam onto a target element, the head-up display device comprising:
a display unit, a first optical module, and a second optical module, wherein:
the display unit is adapted to provide the first image beam and the second image beam;
the first optical module receives the first image beam and the second image beam from the display unit, and transmits the first image beam and the second image beam to the second optical module,
wherein the first optical module comprises a first reflection mirror and a second reflection mirror that are disposed adjacently; and wherein the second reflection mirror is not parallel to the second optical module, and the second reflection mirror is a curved mirror,
the second optical module comprises a freeform mirror for receiving the first image beam and the second image beam from the first optical module, the first image beam and the second image beam are respectively reflected by the second optical module out of the head-up display device and then transmitted to the target element to form a first virtual image and a second virtual image, wherein, through the first optical module, an optical path length of the first image beam from the display unit to a position of the first virtual image formed by the first image beam is greater than an optical path length of the second image beam from the display unit to a position of the second virtual image formed by the second image beam.

15. The head-up display device according to claim 14, wherein the first image beam from the display unit is reflected by the first reflection mirror to the second optical module, and the second image beam from the display unit is reflected by the second reflection mirror to the second optical module.

16. The head-up display device according to claim 14, wherein an optical path length of the first image beam from the display unit to the second optical module is greater than an optical path length of the second image beam from the display unit to the second optical module.

17. The head-up display device according to claim 14, wherein the first reflection mirror is a plane mirror.

18. The head-up display device according to claim 17, wherein the second reflection mirror is a freeform mirror.

19. The head-up display device according to claim 14, wherein the first reflection mirror is a freeform mirror, and the second reflection mirror is a freeform mirror.

\* \* \* \* \*